(12) United States Patent
Kohl et al.

(10) Patent No.: US 8,381,641 B2
(45) Date of Patent: *Feb. 26, 2013

(54) DROP-IN PASSIVE THERMAL INSERT FOR FOOD SERVICE COUNTERS

(75) Inventors: Korey V. Kohl, Rogers, MN (US); Robert A. Iverson, Mound, MN (US); Loren Veltrop, Chicago, IL (US); Christopher B. Lyons, Lagrange Park, IL (US); Donald Van Erden, Wildwood, IL (US)

(73) Assignee: Prince Castle, LLC, Carol Stream, IL (US)

( * ) Notice: Subject to any disclaimer, the term of this patent is extended or adjusted under 35 U.S.C. 154(b) by 943 days.

This patent is subject to a terminal disclaimer.

(21) Appl. No.: 12/329,795

(22) Filed: Dec. 8, 2008

(65) Prior Publication Data

US 2010/0139906 A1    Jun. 10, 2010

(51) Int. Cl.
*A47J 39/00* (2006.01)

(52) U.S. Cl. .............. 99/448; 219/214; 99/483; 99/426; 312/236; 62/246; 165/80.3

(58) Field of Classification Search .............. 165/80.3; 62/246, 257, 458; 312/236; 219/214
See application file for complete search history.

(56) References Cited

U.S. PATENT DOCUMENTS

| | | | |
|---|---|---|---|
| 664,079 A | 12/1900 | Friel | |
| 1,786,827 A | 12/1930 | Copeman | |
| 4,005,586 A | 2/1977 | Lyons | |
| 4,494,654 A | 1/1985 | Gunther | |
| 4,782,670 A | 11/1988 | Long et al. | |
| 4,852,741 A | 8/1989 | Van Benschoten | |
| 5,007,552 A | 4/1991 | Sage | |
| 5,073,390 A | 12/1991 | Knight, III et al. | |
| 5,207,150 A | 5/1993 | Wellman et al. | |
| 5,711,210 A | 1/1998 | Kaufman | |
| 5,720,552 A | 2/1998 | Schindlegger | |
| 5,921,096 A * | 7/1999 | Warren | 62/185 |
| 6,082,114 A * | 7/2000 | Leonoff | 62/3.64 |
| 6,269,965 B1 | 8/2001 | White et al. | |
| 6,557,363 B1 | 5/2003 | Haasis et al. | |
| 7,357,000 B2 * | 4/2008 | Schwichtenberg et al. | 62/255 |
| 7,784,759 B2 * | 8/2010 | Farrell | 248/315 |
| 7,870,891 B2 * | 1/2011 | Rule | 165/160 |
| 8,087,351 B2 * | 1/2012 | Kohl et al. | 99/403 |
| 8,177,418 B2 * | 5/2012 | Edwards et al. | 366/249 |
| 2009/0095169 A1 | 4/2009 | York | |

OTHER PUBLICATIONS

Passaniti, Sebastiano, USPTO Office Action Summary—U.S. Appl. No. 12/478,439, Sep. 19, 2011.

* cited by examiner

*Primary Examiner* — M. Alexandra Elve
*Assistant Examiner* — Amit K Singh
(74) *Attorney, Agent, or Firm* — Kelly & Krause LP; Joseph P. Krause, Sr.

(57) ABSTRACT

Passive temperature control is provided to vessels too tall to be stored in a shallow, temperature-controlled tray or basin by a vertically oriented thermally-conductive tube. In one embodiment, an insulative collar covers the tray and insulates portions of the tube that extend above the top of the tray. Optional heat sinking fins and air convection holes increase heat transfer between the tube and the tray.

28 Claims, 9 Drawing Sheets

DROP-IN PASSIVE THERMAL INSERT FOR FOOD SERVICE COUNTERS

FIELD OF THE INVENTION

This invention relates to a thermally-insulated canister, usable to vertically extend a heated or refrigerated volume of heated or refrigerated food-serving tray.

BACKGROUND OF THE INVENTION

FIG. 1 shows a prior art food service counter 10 for food storage trays 12 that can keep foods hot or cold. The foods kept in such trays 12 include meats and condiments used to make sandwiches or other food products. FIG. 1 also shows a food condiment dispenser 20 in the trays 12 that is intended to control the temperature of foods kept in the tray.

FIG. 2 is a cross section of a prior art food storage tray 12. In the case of refrigerated trays 12, refrigeration lines 14 absorb heat from the side walls and/or bottom of the tray 12 in order to keep the air inside the tray 12 cold. A vessel 20 embodied as a condiment dispenser is shown in FIG. 2 to be standing upright inside the tray 12. The vessel 20 has a lower portion 24 below the open top 16 of the tray and an upper portion 22 above the open top 16.

It is well known that temperature gradients exist within food-serving trays 12. Room air currents mix with air in the tray 12, which tend to warm the top of a refrigerated tray and cool the top of a heated tray. The air temperature inside and near the top 16 of the tray 12 will almost always be different than the air temperature inside and at the bottom of the tray 12. Food storage trays 12 are therefore less than ideal for storing perishable foods for long periods of time, especially when ambient room air temperatures are high and/or when room air currents are relatively brisk. Upper portions 22 of tall vessels 20 are not refrigerated at all.

Some restaurants, sandwich shops and food services prepare foods that include made-to-order sandwiches, ice cream and pizza. Many such establishments add condiments to their products, examples of which can include but are not limited to, whipped cream, salad dressing, cheeses and mayonnaise. They usually add such condiments using well-known, hand-held dispenser squeeze bottles.

Many condiments need to be kept refrigerated in order to preserve their freshness. Dispensers from which such condiments are dispensed therefore also need to be refrigerated.

While restaurants and food service providers that add perishable condiments to food products know that some condiments need to be kept refrigerated, capital equipment costs, operating expenses and food product preparation time constraints can force many restaurants and food service providers to forego properly refrigerating condiment dispensers 20. Some restaurants and food services have taken to storing hand-held condiment dispensers in a refrigerated tray 12 when the condiment dispensers 20 are not being used in order to keep the dispensers somewhat chilled but nevertheless accessible.

Refrigerated food storage trays 12 used in prior art food service counters 10 are too shallow to properly refrigerate tall, hand-held condiment dispensers 20. Even if the trays 12 were as deep as a condiment dispenser is tall, the temperature gradient inside the tray is nevertheless inadequate to properly chill the top, upper-most part 22 of a tall condiment dispenser 20 because of the temperature gradient that exists in the trays 12. Lowering the nominal tray temperature so that the top portion 22 is kept at or below a proper condiment storage temperature might mean that the bottom portion of a tray goes below 32° F., which would freeze contents at the bottom portion 24 of a dispenser 20. An apparatus and method for assisting the refrigeration of a elongated, upright, hand-held dispensers in a food storage tray 12 would be an improvement over the prior art.

DETAILED DESCRIPTION

Figure 3:
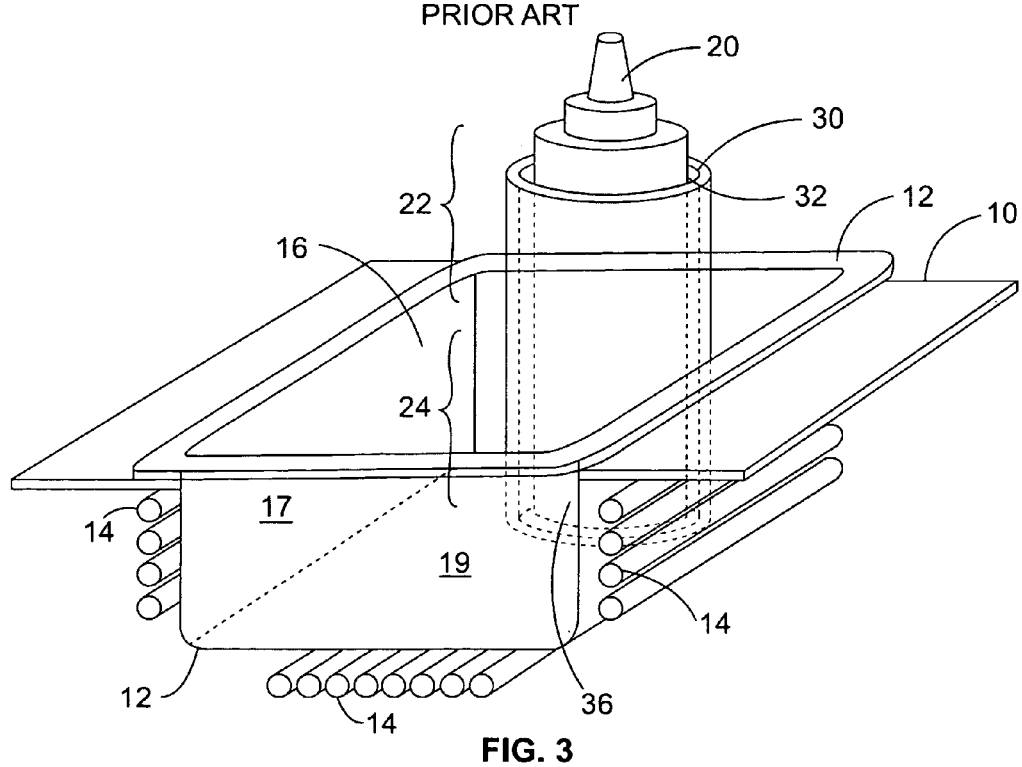
FIG. 3 is a perspective view of a drop-in passive refrigeration canister in a food storage tray.

FIG. 3 shows a perspective view of drop-in passive thermal insert canister 30, in an actively-refrigerated food storage tray 12 in a food service counter 10. As used herein, the term, "canister 30" is used interchangeably with the term, drop-in passive thermal insert 30. For simplicity and clarity purposes, the description of the canister 30 hereafter is with respect to its usage with a cold food storage tray 12. As set forth below, however, the canister 30 could also be used with a hot storage tray.

Figure 1:
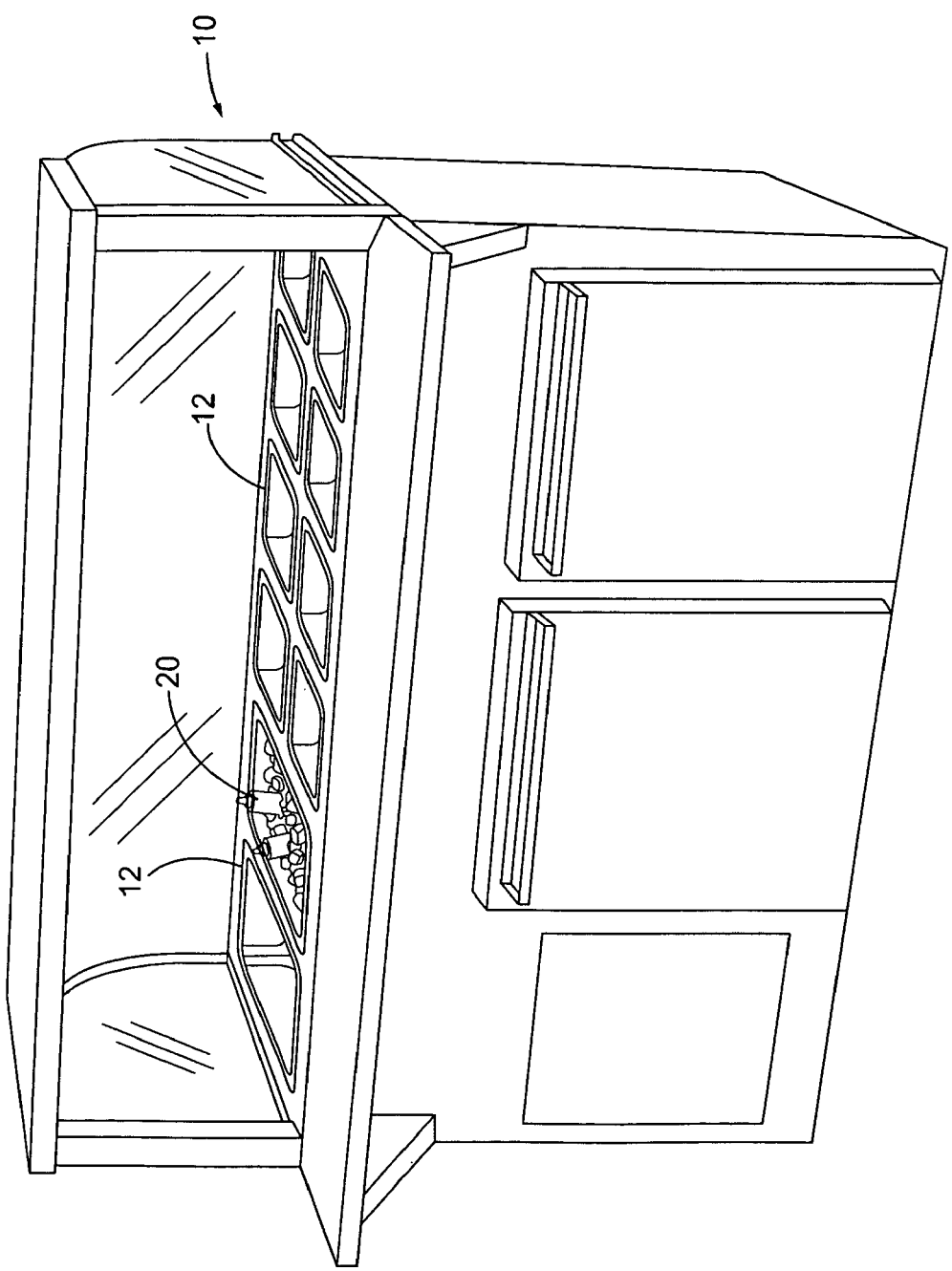
FIG. 1 shows a prior art food service counter including several food storage trays.
Figure 2:
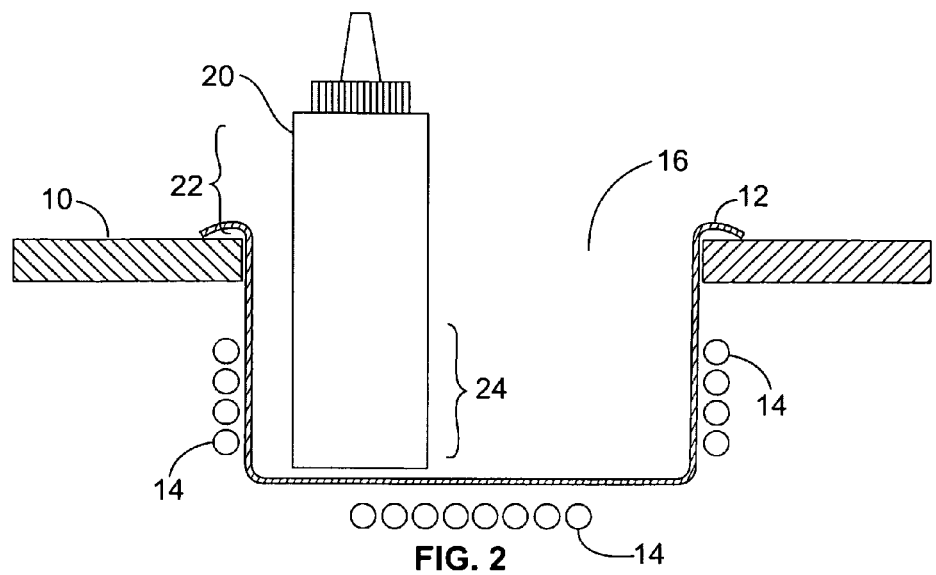
FIG. 2 shows a prior art food storage tray.

The top 16 of a food storage tray 12 is usually left open, as shown in FIGS. 1-3 in order to allow the tray to be filled, but more importantly to allow tray contents to be removed. A consequence of leaving the tray 12 top 16 open is that circulating room air tends to warm the air inside the tray and near the top 16 of the tray 12. Room air and convective currents thus tend to create a temperature gradient inside the tray 12.

FIG. 3 also shows a first example of a canister 30, configured to passively refrigerate a tall, upright, condiment dispensing vessel or "vessel" 20. The canister 30 is preferably embodied as a tube, oriented or "standing" upright in the tray 12 such that the center axis or length dimension of the tube is orthogonal to the bottom 19 of the tray 12.

The canister 30 has a height that is greater than the depth of the tray 12, the tray depth being considered herein to be equal to, or substantially equal to, the distance between the open top 16 of the tray 12 and the bottom 19 of the tray. As set forth below, the portion of the canister 30 above the top 16 of the tray 12 allows the canister 30 to provide passive temperature control, i.e., refrigeration or heating, to the upper portion 22 of the vessel 20 stored inside the tube, the upper portion 22 of the vessel 20 being considered to be the portion of the vessel above the top 16 of the tray 12.

The tube forming the canister 30 shown in the figures has an open interior that defines an open volume that accepts a vessel 20, such as the aforementioned hand-held condiment dispenser. (Vessel and condiment dispenser are hereafter used interchangeably.) The height of the canister 30 is greater than the depth of the tray 11, but less than the height of a vessel 20 to be passively refrigerated in order to allow the vessel 20 to be grasped for removal from the canister 30.

Figure 4:
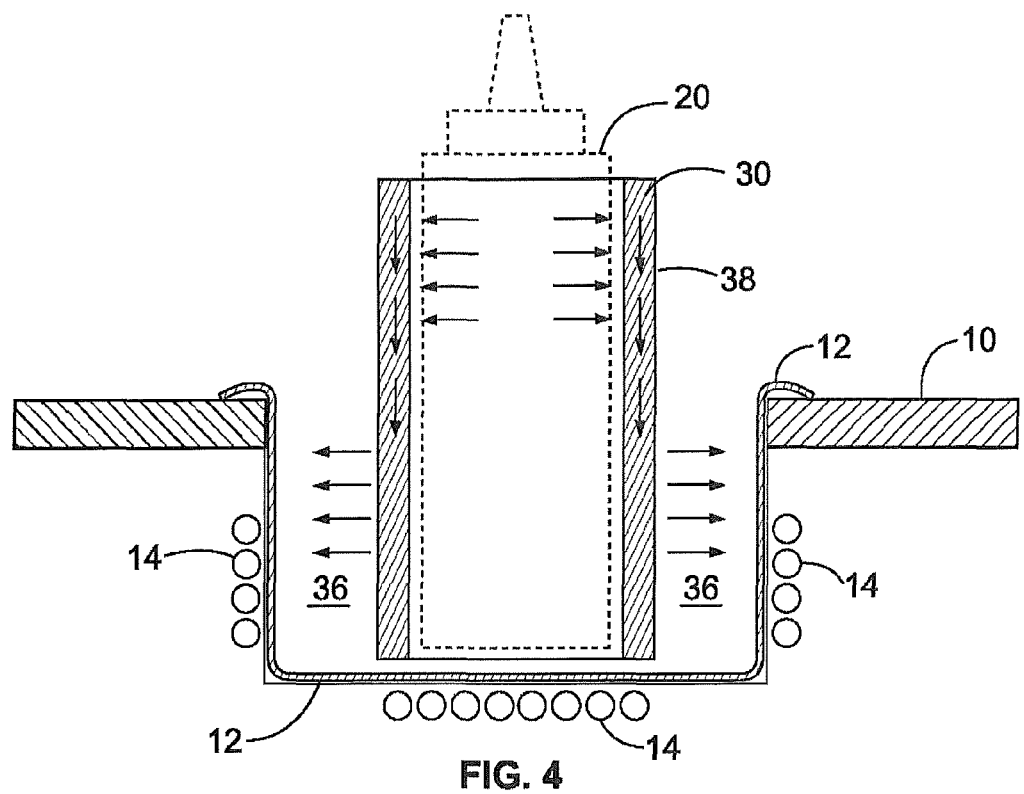
FIG. 4 is a cross section of a drop-in passive refrigeration canister, an included passively refrigerated vessel 20 and a refrigerated food storage tray wherein heat flow is depicted by arrows.

FIG. 4 is a cross sectional view of the canister 30 and a refrigerated tray 12. Phantom lines show a condiment dispenser 20 inside the canister 30. The arrows in FIG. 4 indicate heat flow direction for a refrigerated, i.e., cold food storage tray 12. The direction of the arrows shown in FIG. 4 would be reversed from a hot food storage tray.

As can be seen in FIG. 4, the canister 30 provides a heat-absorbing body to vessel 20, which provides passive refrigeration by absorbing heat radiated from the vessel 20 and re-radiating the vessel-originated heat into the tray 12. When the canister 30 is installed into the tray 12, latent heat in the lower portion 36 of the canister 30 radiates from the canister 30 into cold air in the tray 12, including in particular the lowest and coldest portion of the tray 12, i.e., the bottom surface 19. In some embodiments, the canister 30 does not rest on the bottom 19 of the tray 12, but is instead suspended from either the counter 10 top or tray side walls. In other embodiments wherein the canister 30 rests or "sits" on the bottom 19 of the tray 12, heat in the lower portion 36 of the canister 30 is also conducted from the canister 30 into the bottom 19 of the tray.

Radiating and/or conducting heat from the lower portion 36 of the canister 30 into the tray 12 causes the temperature of lower portion 36 of the canister 30 to drop, relative to the temperature of the upper portions 38 of the canister 30. Because the canister 30 is constructed of thermally-conductive material, latent heat in the initially warmer upper portion 38 of the canister 30 is conducted downward, through the canister material to the colder, lower portion 36 of the canister 30 where it, too, is radiated and/or conducted into the tray 12.

When heat is conducted from the upper portion 38 of the canister 30 to the lower portion 36, the temperature of the upper portion 38 of the canister 30 will decrease, relative to its surroundings. A decreased temperature of the upper portion 38 of the canister 30 allows the upper portion 38 of the canister 30 to absorb heat radiated from the upper portion of a relatively warmer vessel 20 placed inside the canister 30. The canister 30 is thus able to absorb heat radiated from a vessel 20 inside the canister and re-radiate (as well as conduct) the heat from the vessel 20 into the tray 12, so long as the temperature of a vessel inside the canister 30 is greater than the temperature of the canister 30 itself. Heat radiated from a vessel 20 inside the canister 30, including in particular heat radiated from a vessel at elevations of the vessel that are above the top 16 of the tray 12, is thus captured by the canister 30, conducted downward through the canister 30 and radiated and/or conducted into the tray 12 for absorption by a refrigeration device, not shown. The structure, geometry and material of the canister 30 thus provide a passively temperature-controlled space above the top 16 of the tray 12 and above the top of a food service counter 10 in which a tray might be installed and operated with.

The canister 30 shown in the figures is embodied as a cylindrical, aluminum tube. It has an open top 32 to receive a cylindrical, hand-held condiment dispenser 20. In an alternate embodiment, the opposite end of the cylinder, i.e., the bottom 39 of the tube, is closed off to form a flat, thermally-conductive bottom that can either rest on or be suspended above the bottom 19 of the tray 12. The increased area of a flat, closed-off bottom enhances heat conduction between the canister 30 and the tray 19, but requires additional material and hence additional fabrication cost. A closed-off bottom can also make cleaning the canister 30 more difficult.

The canister 30 has an interior cross sectional shape that preferably conforms to and which is just slightly larger than the exterior shape or cross section of a vessel 20, the temperature of which is to be passively controlled. Matching the interior shape and size of the canister 30 to the exterior shape and size of a vessel to be passively refrigerated improves passive temperature control by tightening the thermal coupling between the two bodies. Another embodiment uses a canister 30 having an inside diameter that allows the exterior surface of the vessel 20 to physically contact the insider surface of the canister and remain in physical contact therewith in order to facilitate conductive heat transfer between the vessel 20 and the canister 30. Alternate embodiments of the canister 30 can have non-circular cross sections that can be square, rectangular, oval or elliptical, triangular or any irregular closed polygon, but as set forth above, the cross section of the canister 30 preferably matches, and is only slightly greater than the cross section of a vessel to be passively refrigerated.

Figure 5:
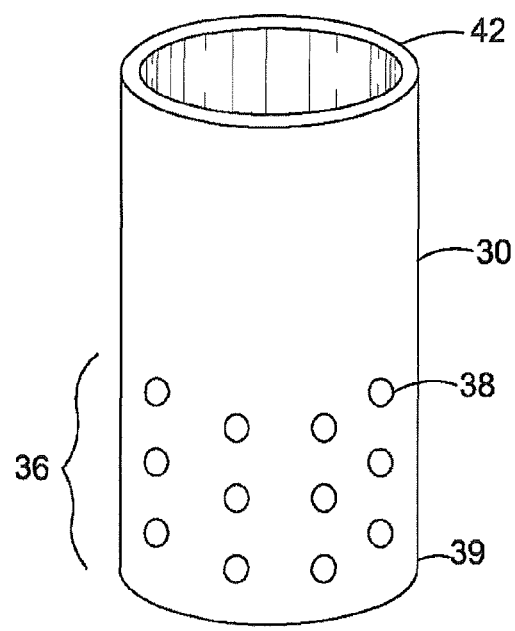
FIG. 5 is a perspective view of an alternate embodiment of a drop-in passive refrigeration canister.

FIG. 5 depicts an embodiment of a canister 30, the lower portion 36 of which is optionally perforated with holes 37 to facilitate air movement through the interior of the canister 30. Providing holes 37 in the lower portion 36 but not in the upper portion allows conditioned air (warm or cold air) in a food storage tray 12 to move through the lower portion 36 of the interior of the canister 30, which improves convective heat transfer between the canister 30, a vessel 20 inside the canister 30 and the tray 12. Not providing holes in the upper portion prevents ambient air from circulating into the conditioned, upper portions of the interior of the canister 30. When holes 37 are provided to a canister, they are preferably formed from the bottom 39 of the tube to a level corresponding to the top 16 of the tray 12 so that the holes 37 are located within the tray 12.

Figure 6A:
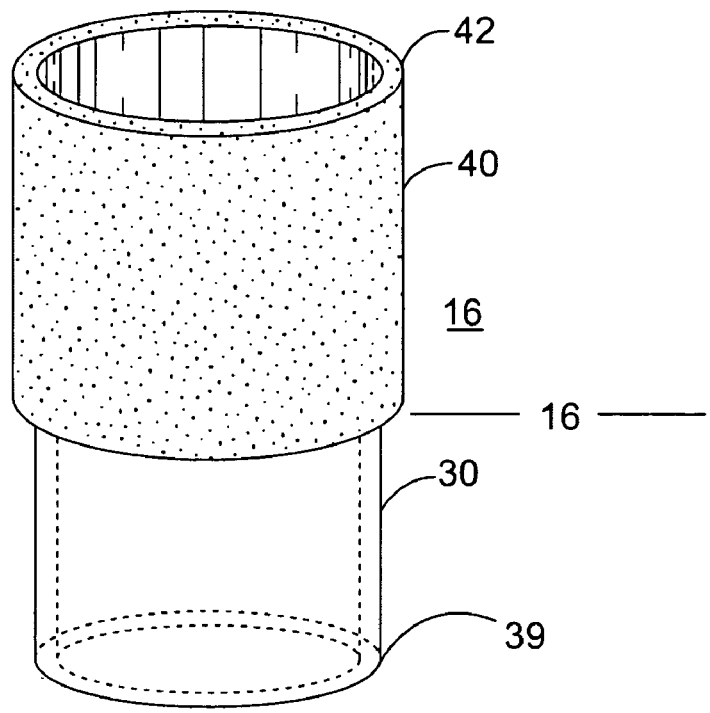
FIG. 6A is a perspective view of another embodiment of a drop-in passive refrigeration canister with an insulation layer.

FIG. 6A shows another embodiment of a canister 30 wherein the canister 30 is provided with a relatively thin thermal insulation layer 40 around the outside of the upper portion of the tube forming the canister 30. The insulation layer 40 preferably covers only the portion of the canister 30 that extends above the top 16 of a tray 12 in order to reduce heat transfer between portions of the canister above the top 16 of the tray 12 and ambient room air. In FIG. 6A, the insulation layer 40 has a uniform outside diameter and extends from the top 42 of the tube down to the level of the tube that would be adjacent the top 16 of the tray 12, when the canister 30 placed into a tray 12. The lower portion of the canister 30, i.e., the portion below the top of the tray 12 down to the bottom 39 of the tube is not insulated, which creates a discontinuity in the outside surface of the canister 30 where the insulation layer ends.

Figure 6B:
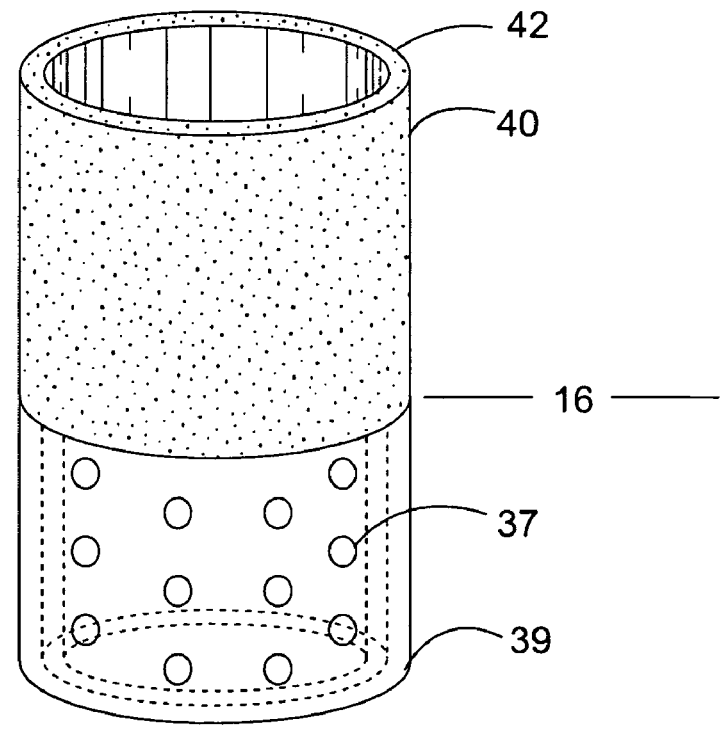
FIG. 6B is a perspective view of an alternate embodiment of drop-in passive refrigeration canister with an insulation layer.

In FIG. 6B, the wall thickness of the tube, the tube diameter or both are increased from the bottom 39 of the tube up to the elevation where the insulation layer 40 ends so that exterior of the canister 30 does not have an outside diameter discontinuity shown in FIG. 6A located where the insulation layer ends. Holes 37 are optionally formed into the lower portion of the embodiment of FIG. 6A or the embodiment of FIG. 6B in order to facilitate convective heat transfer.

Figure 7:
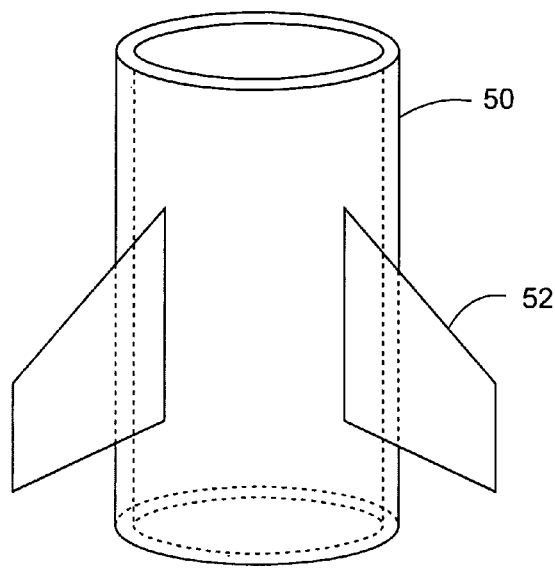
FIG. 7 is a perspective view of an alternate embodiment of a drop-in passive refrigeration canister.

FIG. 7 shows another alternate embodiment of a passive canister 30 wherein the passive canister 30 is provided with thermally-conductive fins 52 that extend outwardly from the exterior surface of the passive canister 30. The thermally-conductive fins 52 increase the surface area of thermally-conductive material that can radiate heat from the canister 30 into cold air inside a refrigerated tray 12. The fins 52 thus increase the rate at which heat radiated from a vessel 20 can be absorbed by the passive canister 30 and dissipated/radiated into cold air in the tray 12.

Figure 8:
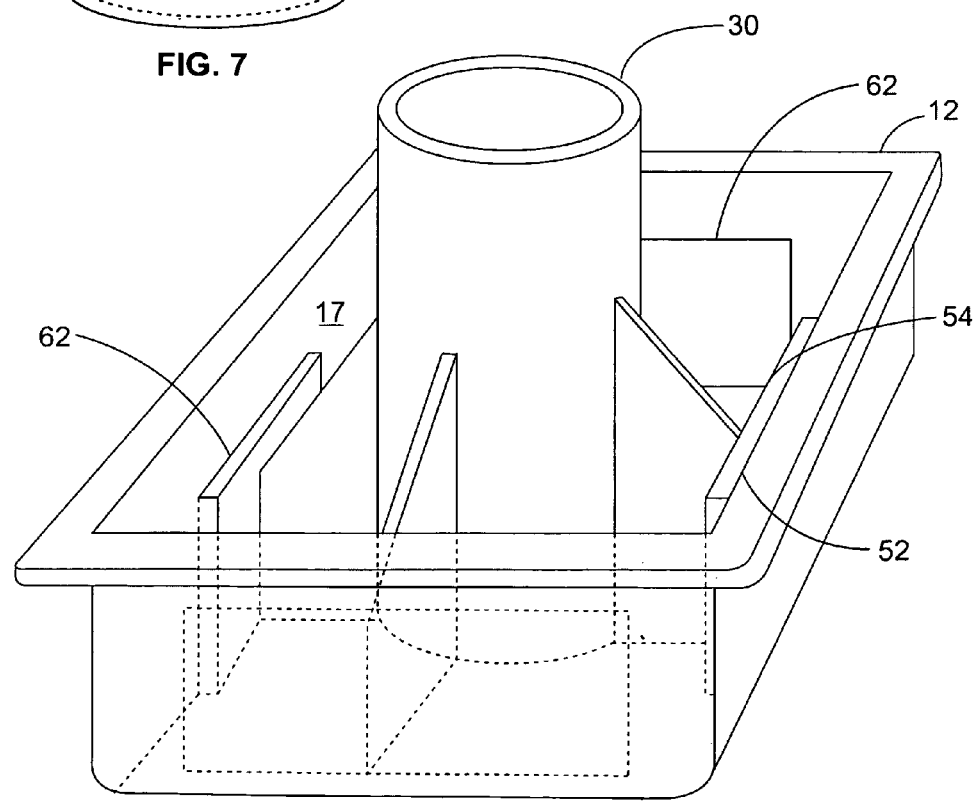
FIG. 8 is a perspective view of an alternate embodiment of a drop-in passive refrigeration canister inside a tray.

FIG. 8 is a perspective view of another embodiment of a canister 30 wherein ends 54 of the fins 52 are provided with plates 62, also referred to as gussets, which make contact with the side walls 17 of a temperature controlled tray 12. The fins 54 and plates/gussets 62 are sized to physically contact (make a physical connection with) walls 17 of the tray 12, which enables conductive heat transfer between the thermal canister 30 and the tray 12 as well as radiation between the fins and air inside the tray 12. As with the embodiments depicted in FIGS. 3-6, embodiments depicted in FIGS. 7 and 8 are also optionally provided with holes in the lower portions to facilitate air movement through the interior of the canister as well as an insulation layer as shown in FIG. 6. The holes and insulation layer are not shown in FIGS. 7 and 8 in the interest of clarity.

Figure 9:
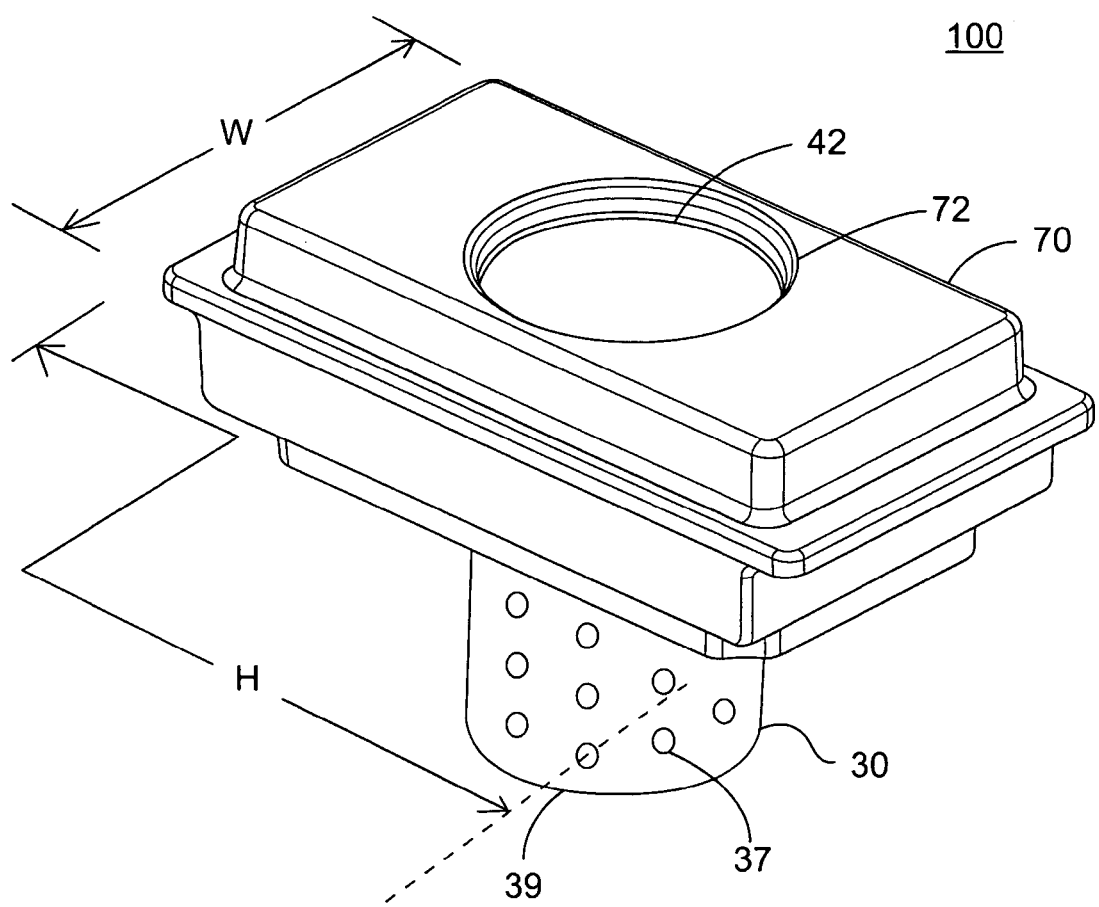
FIG. 9 is a perspective view of a preferred embodiment of a drop-in passive thermal insert canister provided with a cover that insulates upper portions of the tube and which also covers a tray.

The canister embodiments described above illustrate structures that vertically extend temperature-controlled environments provided within a relatively shallow, temperature controlled food storage trays. As was set forth above, however, room air and convection currents can create temperature gradients with a tray 12 that can adversely affect the performance and operation of the embodiments set forth above. FIG. 9 therefore illustrates a perspective view of canister 30 provided with a collar 70 formed from a thermally insulating material having an exterior shape that will mate with and be received into an open top 16 of a food storage tray, not shown in FIG. 9.

The collar 70 shown in FIG. 9 is rectangular. It has a width W and a height H and side profiles (contours or shapes) selected so that the collar 70 fits over and/or just inside the open top of a rectangular food storage tray in order to keep ambient air out of the tray and to simultaneously provide insulation to surfaces of the canister 30 above the tray 12. While the embodiment shown in FIG. 9 is configured to mate with a rectangular tray, alternate embodiments of the collar 70 are configured to mate with any one of a square, round, oval, elliptical or irregular shape tray.

As can be seen in FIG. 9, the collar 70 is provided with a through hole 72 that receives a thermally-conductive canister 30, embodiments of which are described above and depicted in FIGS. 3-8. The fit between the surface of the hole 72 and the canister 30 is a design choice. As with the canister embodiments described above, holes 37 are also optionally provided in the lower portion of the canister 30, i.e., the portion of the canister 30 located below the bottom, lower surface of the insulative collar 70 (not shown in FIG. 9) so as to facilitate air movement between the interior of the tray and the interior of the canister 30.

Figure 10:
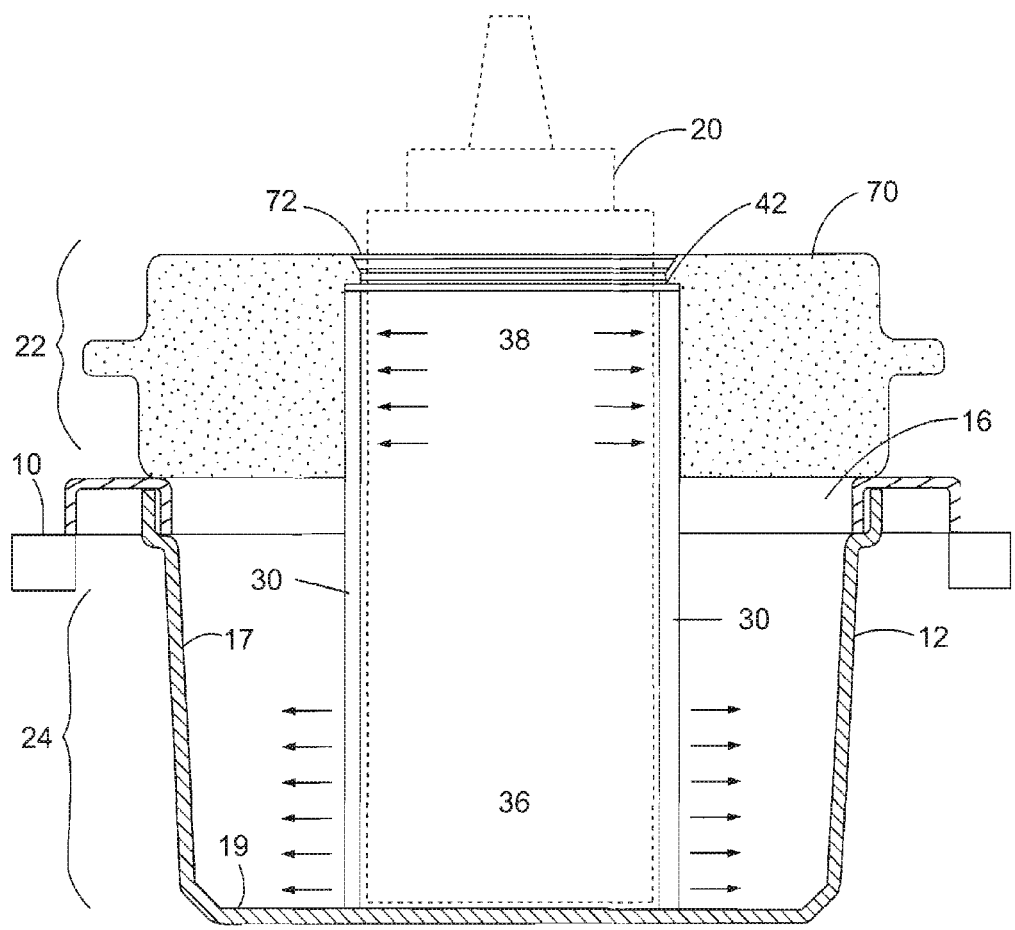
FIG. 10 is a cross section of the drop-in passive thermal insert canister inside a refrigerated food storage tray and depicting heat flow direction.

FIG. 10 is a cross sectional view of the embodiment depicted in FIG. 9. In FIG. 10, a temperature-controlled food storage tray 12 is installed into a food service counter 10. The canister 30, such as one of those depicted in FIGS. 3-8, extends through the collar 70, i.e., from one side of the collar, through the hole 72 to the opposite side of the collar 70. A condiment dispenser 20 is shown placed inside the canister 30, the height of which extends above the top of the canister 30 and above the top of the collar 70 so that the condiment dispenser 20 can be grasped for removal.

In FIGS. 9 and 10, the top 42 of the canister 30 is shown just below the top of the collar 70. In an alternate embodiment, the top 42 is perfectly flush or nearly flush with the top of the collar 70. Another alternate embodiment (not shown) uses a taller canister 30 that extends above the top, upper most surface of the collar 70 so as to project upwardly from the collar 70. Yet another embodiment uses a shorter canister that extends only part way through the collar 70 such that the top 42 of the canister 30 is below the top surface of the collar.

Arrows in FIG. 10 show the direction of heat flow in a refrigerated food storage tray. The direction of heat flow would be reversed in a heated food storage tray.

In FIG. 10, heat is radiated and/or conducted from the lower portion 36 of the canister 30 into the tray 12, causing the temperature of the lower portion 36 to decrease. Heat in the upper portion 38 is conducted from the upper portion 38 of the canister 30 to the lower portion 36 causing the temperature of the upper portion 38 to decrease. Heat radiated from the condiment dispenser 20 to the upper portion 38 or conducted from the upper portion of the dispenser 20 into the upper portion of the canister 30 is conducted down to the lower portion 36 where it is re-radiated into the tray 12. The insulating collar 70 substantially eliminates heat transfer between the canister 30 and ambient air. The insulating collar 70, which also covers the open top 16 of the tray 12, substantially eliminates heat transfer between the inside of the tray 12 and ambient air.

Figure 11:
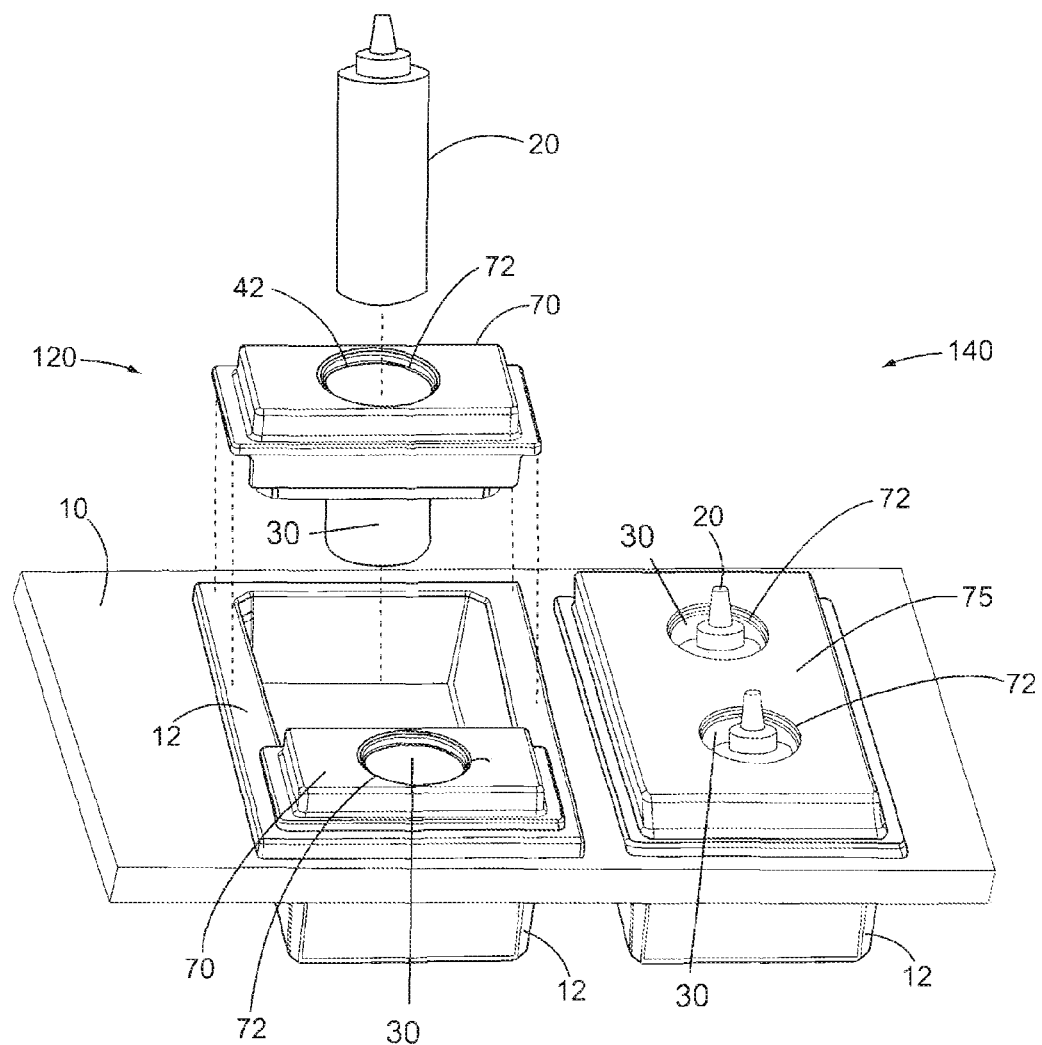
FIG. 11 includes an exploded view of a preferred embodiment of a drop-in passive thermal insert, showing the placement of a condiment dispenser and a configuration where two drop-in canister inserts are installed in a single tray and a drop-in canister insert having two passive refrigeration tubes and a single insulating cover.

FIG. 11 shows a drop-in passive thermal insert or canister 30 with an insulating collar 70, which together form an assembly 120 configured to allow two such assemblies to fit within a single food storage tray 12. In FIG. 11, two canisters 30 are fitted to a single, rectangular insulating collar having two through-holes. In another embodiment also shown in FIG. 11, a single canister 30 is fitted with a square insulating collar that is configured to mate with a square food storage tray. The trays 12 with the canisters 30 are shown in FIG. 11, installed into a food service counter 10.

From a different perspective, FIG. 11 also shows an embodiment of a thermally-insulating collar 75, which is configured to substantially or completely cover a single tray 12 but which has two holes 72 to accept two, drop-in passive thermal inserts or canisters 30. The thermally-insulating collar 75 thus accepts a plurality of canisters 30 and provides a single, unified, thermally-insulating cover for a food storage tray having multiple holes for multiple canisters 30 and which minimizes or at least reduces heat transfer between the canisters 30 and ambient room air.

Figure 12:
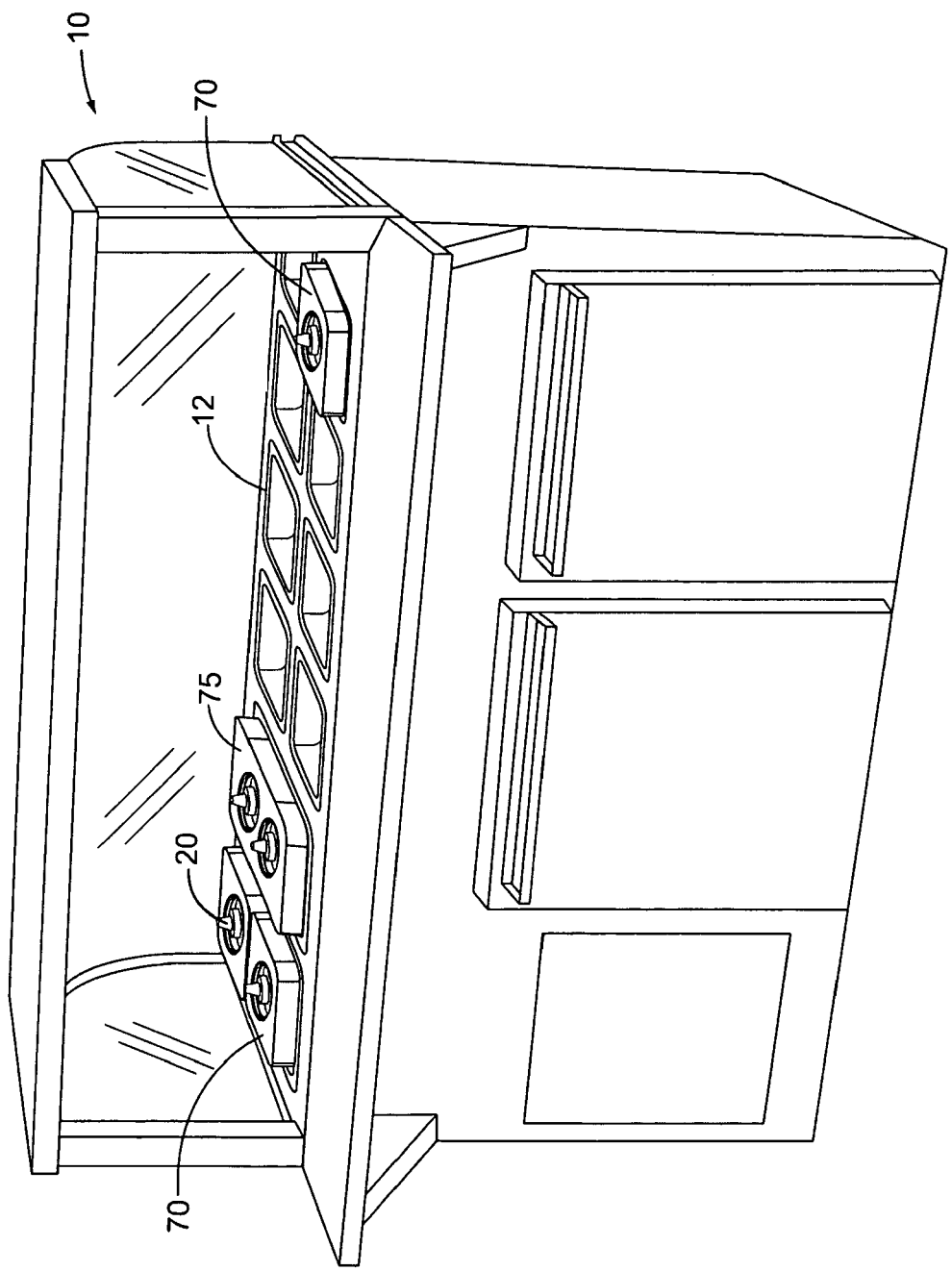
FIG. 12 depicts a food service counter with temperature controlled trays having drop-in passive thermal inserts.

As used herein, a drop-in passive thermal insert, which is also referred to herein as a canister, should be considered to include any thermally-conductive structure that can enclose a vessel taller than a temperature-controlled food storage tray and which exchanges heat between itself and the tray. Those of ordinary skill in the art will recognize that a drop-in passive insert, specifically including the embodiments depicted in the figures and described above, can be advantageously used with a food service counter, as shown in FIG. 12. The temperature of hand-held dispensers 20 that need to be kept nearby but which might be too tall to be stood up right and kept at an appropriate temperature in a relatively shallow food storage tray can be kept handy and more appropriately cooled or heated in one or more trays 12 of the food service counter 10 using any one or more of the embodiments described above and depicted in the figures.

While the preferred embodiment of the canister has been described with respect to passive refrigeration, those of ordinary skill in the art will recognize that the canisters can also be used with hot trays, with or without the aforementioned insulating collars 70, the difference between them being only the direction of heat flow. When the passive canisters described above are used with a cold tray, heat flows in the direction shown in FIG. 4. When the passive canisters are used with a hot tray, heat flows in a direction opposite to the direction shown in FIG. 4.

It should be apparent from the foregoing description that a method has been described for storing and passively controlling the temperature of a hand-held condiment dispenser, having a height greater than the depth of a temperature-controlled tray. In a first step of such a method, a thermally-conductive tube of any of the aforementioned shapes is placed inside a temperature-controlled food storage tray, which is also provided to a temperature-controlled food service counter as shown in FIG. 12. As described above, the thermally-conductive tube used in the process has a height greater than the depth of the tray. The tube also has an open top and an interior volume that will accept a hand-held condiment dispenser or other vessel.

In a second step, a condiment dispenser or other vessel is placed inside the open volume of the thermally-conductive tube, which is also referred to herein as a canister. Since the temperature through-out the interior of the canister, is at or near the temperature of the temperature-controlled tray, over time, the temperature of a vessel placed into the canister will eventually reach a temperature equal to or nearly equal to the temperature of the tray. As used herein, such a step is considered to be temperature equalization.

In another step, which can take place before or after the second step, the temperature controlled food storage tray is covered and portions of the tube that extend above the open top of the tray are thermally-insulated by an insulating collar around the tube and which covers the tray. A condiment dispenser or other vessel can thereafter be provided more effective temperature control (heating or refrigeration) than would otherwise be possible by simply placing a dispenser or vessel into a temperature controlled tray, too shallow to properly heat or refrigerate the vessel. Finally, a food product, such as a sandwich, pizza or an ice cream can be served to a consumer from a food service counter, such as the one depicted in FIG. 12.

The foregoing description and various embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A thermal insert for use with a temperature-controlled tray, the thermal insert being configured to provide temperature control to a vessel placed inside the thermal insert and having a height greater than the depth of the temperature-controlled tray, the thermal insert comprising:

a thermally-conductive tube having an interior volume for receiving the vessel, the tube having an interior cross sectional shape that conforms to and which is larger than the exterior shape of the vessel, the tube capable of being oriented upright in a temperature-controlled tray comprising four solid, substantially planar, substantially rectangular-shaped thermally-conductive side walls extending upwardly from a solid, substantially planar, substantially rectangular-shaped and substantially horizontal thermally-conductive bottom, the side walls and bottom defining a substantially rectangular parallelepiped-shaped volume having an open top, the tray side walls having a height, the tray having a depth defined by the side wall height, such that when said thermally-conductive tube is upright, the thermally conductive tube extends above the open top but has a height less than the height of the vessel the temperature of which is to be controlled, the thermally-conductive tube being sized, shaped and arranged in the tray to transfer thermal energy between, the vessel and the temperature-controlled tray.

2. The thermal insert of claim 1, further comprising a substantially rectangular thermally insulating collar configured to mate with the open top of the tray, the thermally insulating collar having a substantially circular through-hole, configured to receive the thermally-conductive tube.

3. The thermal insert of claim 1, wherein the thermally-conductive tube is comprised of an aluminum cylinder having a circular and substantially continuous cross section between first and second opposing ends, such that when the aluminum cylinder is oriented upright on at least, one end of the cylinder, the second end is located above the top of a tray and being open to receive the vessel.

4. The thermal insert of claim 3, wherein each of the four side walls has an interior side facing into the tray and an exterior side facing outwardly, and wherein the bottom has an interior side facing upwardly and an exterior side facing downwardly, wherein at least one of the exterior sides is adjacent to a refrigeration device, wherein the aluminum cylinder has a flat second end, in contact with the interior side of the bottom, the aluminum cylinder being configured to conduct heat that is absorbed from a vessel in the aluminum cylinder into the bottom of the tray, the tray being configured to conduct heat from the aluminum cylinder into the refrigeration device.

5. The thermal insert of claim 3, further comprising an insulation layer on the outside of the thermally-aluminum cylinder and covering the length of the cylinder that extends above the top of the tray.

6. The thermal insert of claim 1, wherein at least part of the side walls are substantially orthogonal to the bottom.

7. The thermal insert of claim 1, wherein the thermally-conductive tube is further comprised of at least one thermally-conductive fin.

8. The thermal insert of claim 1, wherein the thermally-conductive tube is further comprised of at least one thermally-conductive fin that extends laterally from the tube to a side wall of said tray, the fin conducting heat between said tray and the thermally-conductive tube.

9. The thermal insert of claim 1, wherein the thermally-conductive tube is perforated with a plurality of holes in a first portion of the tube, located between the top and bottom of the tray.

10. The thermal insert of claim 1, wherein the tray is sized to be able to provide open air space completely around the thermally-conductive tube when the tube is placed inside the tray and wherein the thermal insert is sized to be able to provide air space completely around a vessel placed into the thermal insert, the temperature of which is to be controlled.

11. A thermal insert for use with a temperature-controlled tray the thermal insert comprising:

a cylindrical, thermally-conductive tube configured to be placed into and oriented upright in a substantially rectangular-shaped, thermally conductive tray comprising a plurality of solid sidewalls that extend upwardly from a solid and substantially planar bottom, the tray having an open top, the sidewalls having a height above the bottom and which defines a depth of the tray, the tube having an interior volume for receiving a vessel having a height greater than the depth of the tray, the interior volume of the thermally-conductive tube having a cross sectional shape that conforms to and which is larger than the exterior shape of the vessel, said thermally-conductive tube having a height greater than the depth of the temperature-controlled tray and less than the height of the vessel.

12. The thermal insert of claim 11, wherein the tube is sized, shaped and arranged to be able to provide an air gap completely around a vessel inside the tube and wherein the tray is configured to provide an air gap completely around the tube when it is inside the tray.

13. The thermal insert of claim 11, wherein the thermally-conductive tube is configured to have a lower portion below the open top of the tray and configured to have an upper portion above the open top of the tray, the upper portion of the tube being exposed to ambient air.

14. The thermal insert of claim 13, wherein the lower portion is provided with at least one thermally-conductive fin extending outwardly from the thermally-conductive tube to contact at least one side wall.

15. The thermal insert of claim 14, wherein the thermally-conductive fin is configured to contact a side wall and the bottom of the tray.

16. The thermal insert of claim 13, further including a thermally insulting collar around the upper portion of the tube.

17. The thermal insert of claim 11, wherein the food storage tray is a refrigerated tray.

18. The thermal insert of claim 11 wherein the food storage tray is a heated tray.

19. A thermally-insulating cover for a temperature-controlled tray having an open top, and at least one side wall surface that extends between the open top and bottom, the tray having depth defined by the height of the at least one side wall surface, the thermally-insulating cover configured to cover the temperature-controlled tray, the thermally-insulating cover having at least one through-hole configured to receive a thermally-conductive tube, the thermally-conductive tube being configured to have an interior cross sectional shape that conforms to and which is larger than an exterior shape of a vessel having a temperature, which is to be controlled by the thermally-conductive tube.

20. The thermally-insulating cover of claim 19, including at least one thermally-conductive tube within the through-hole and extending through the thermally-insulating cover, the tube being configured to have an interior volume to receive a vessel therein, the tube having a length greater than the tray depth but less than the height of the vessel to be received within said thermally-conductive tube.

21. The thermally-insulating cover of claim 20 wherein said thermally-conductive tube is provided with at least one through hole in a lower portion of the tube located away from the thermally-insulating cover.

22. A food service counter comprising:
a temperature-controlled tray comprising four solid, substantially planar, substantially rectangular-shaped thermally-conductive side walls extending upwardly from a solid, substantially planar, substantially rectangular, substantially horizontal bottom, the side walls and bottom defining a substantially, rectangular parallelepiped-shaped volume having an open top, the tray side walls having a height defined by the distance between the open top and the tray bottom;
a thermal insert inside and oriented upright in the temperature controlled tray, the thermal insert having a first portion that extends above the open top, heat energy from a vessel inside the insert being transferred across an air gap into the thermal insert and, conducted through the thermal insert into the temperature-controlled tray.

23. The food service counter of claim 22, wherein the thermal insert is a cylinder having first and second ends, wherein the cylinder is sized, shaped and arranged to stand upright in the tray on one of the first and second ends.

24. The food service counter of claim 23, wherein the cylinder comprises a plurality of through holes.

25. The food service counter of claim 23, wherein the cylinder is configured to be able to provide an air gap completely around a vessel placed into the cylinder and wherein the tray is configured to be able to provide an air gap completely around the cylinder.

26. The food service counter of claim 22, wherein the sides and bottom have interior surfaces facing into the substantially rectangular parallelepiped-shaped volume, and wherein the sides and bottom have exterior surfaces, which are opposite the interior surfaces and face away from the substantially rectangular parallelepiped-shaped volume, at least one of the exterior surfaces of the sides and bottom being adjacent to a refrigeration line.

27. The food service counter of claim 22, the temperature-controlled tray is refrigerated.

28. The food service counter of claim 22 wherein the temperature-controlled tray is heated.

* * * * *